Figure 1:
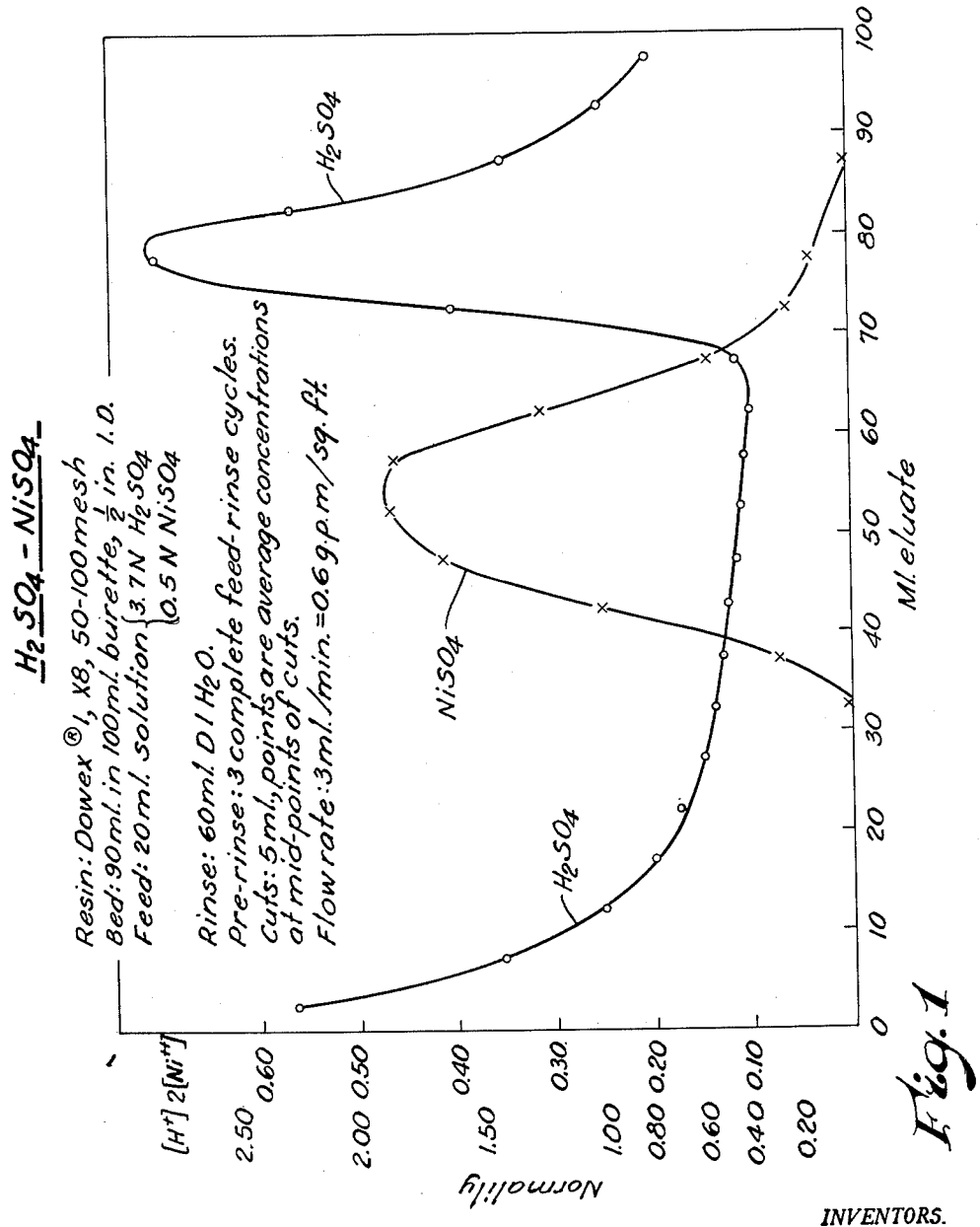

INVENTORS.
Melvin J. Hatch
John A. Dillon, Jr.
BY
ATTORNEY

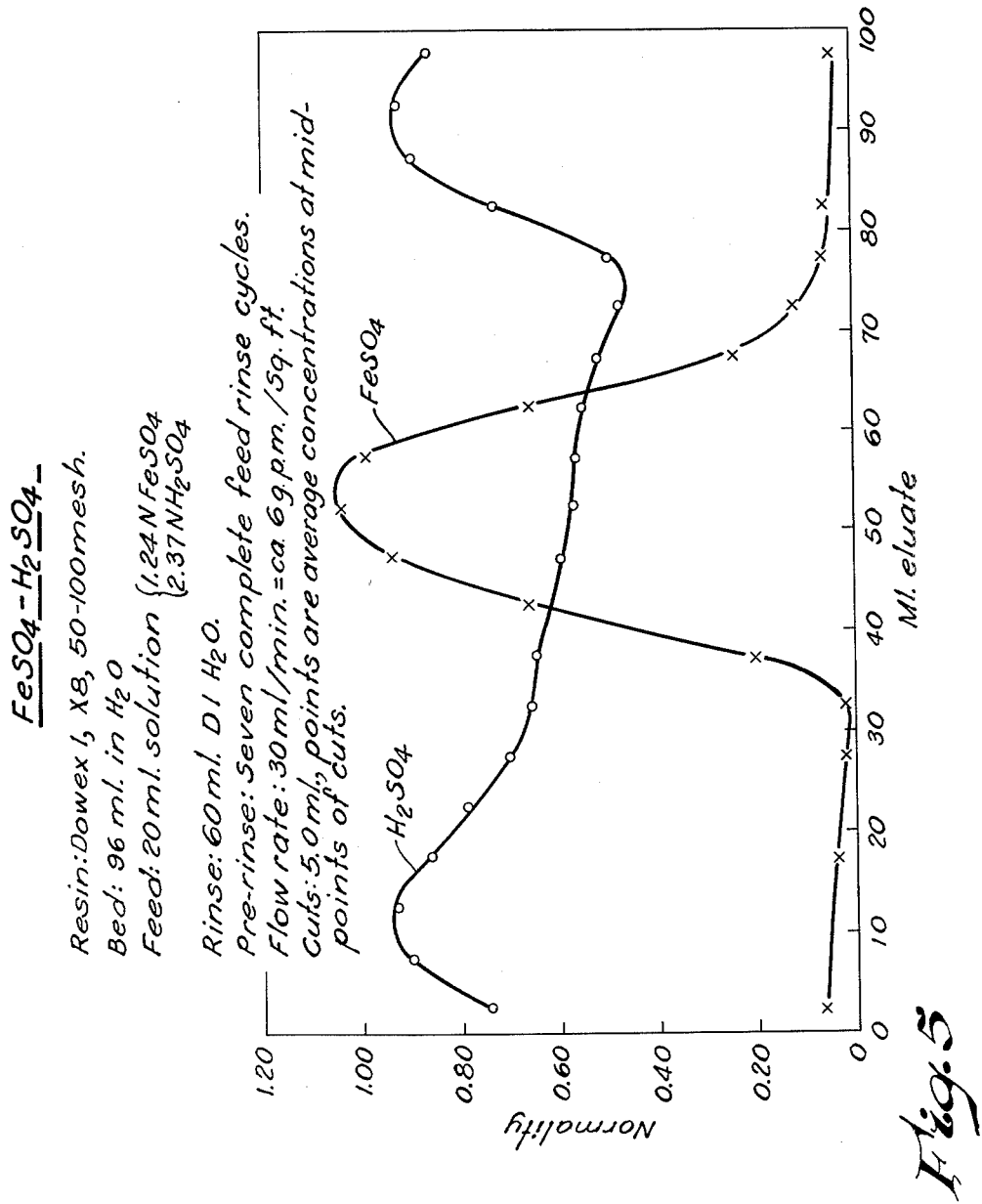

3,067,007
SEPARATION OF STRONG POLYBASIC ACIDS FROM THEIR SALTS

Melvin J. Hatch, Midland, and John A. Dillon, Jr., Coleman, Mich., assignors to The Dow Chemical Company, Midland, Mich., a corporation of Delaware
Filed Jan. 27, 1960, Ser. No. 5,034
7 Claims. (Cl. 23—105)

This invention concerns the separation of strong polybasic acids from their salts using as the separating medium an anion exchange resin in a monovalent anionic form common to that of the strong acid.

It has been believed that all strong electrolytes, whether salts, acids, or bases, are "excluded" from cation or anion exchange resins in the ionic form common to the solution, whereas accompanying weakly ionized or non-ionized substances are absorbed into the resin. See, for example, U.S. Patent No. 2,684,331 for separations based upon this principle. Composite amphoteric ion-exchange resins have also been used to absorb strong electrolytes; Industrial and Engineering Chemistry, vol. 49 (Nov. 1957): 1812 et seq.

It has now been discovered that all the strong polybasic acids, i.e., those having a first ionization constant of at least $1 \times 10^{-3}$, all of which acids were not expected to be absorbed on anion exchange resins in the monovalent anionic form common to the acid, in actuality are absorbed on such anion exchange resins. The salts of these acids, however, are not absorbed to any appreciable extent on these resins. Consequently, good separations of these acids from their salts can be obtained merely by feeding a mixture of them in aqueous solution to an anion exchange resin column in the monovalent anionic form common to the acid, thereafter rinsing the column with water, advantageously distilled or deionized water, or with an aqueous solution of said acid having an acid concentration less than that of the feed, both hereinafter referred to as "aqueous rinsing solution," and collecting successive portions of the effluent liquid, whereby the earlier fractions are enriched in salt relative to acid and the later fractions are enriched in the acid relative to the salt.

This process uses any of the known and commercially available anion exchange resins, and since it is as effective in many cases as processes employing the ion retardation resins (composite amphoteric ion-exchange resins), it is more practical in many cases. Suitable anion exchange resins useful in the practice of this invention include the resinous condensation products of phenol, formaldehyde and alkylene polyamines which are described in U.S. Patent No. 2,341,907; the nitrogen-containing resinous compositions comprising the reaction product of a primary or secondary amine and a halomethylated cross-linked copolymer of a monovinyl aromatic hydrocarbon and a divinyl aromatic hydrocarbon which are described in U.S. Patent No. 2,591,574; the strongly basic quaternary ammonium anion exchange resins comprising the reaction products of a tertiary amine and a halomethylated insoluble cross-linked vinyl aromatic resin such as the resinous compositions which are described in U.S. Patents Nos. 2,591,573 and 2,614,099; and the sulfonium anion exchange resins made by reacting a halomethylated cross-linked copolymer of a monovinylaryl hydrocarbon and a divinylaryl hydrocarbon with a dialkyl, a dihydroxyalkyl or an alkyl hydroxyalkyl sulfide, as described in an application, Serial No. 765,545, filed October 27, 1958. The strongly basic quaternary ammonium anion exchange resins are preferred.

By this process, inexpensive separations of salts of strong polybasic acids from the polybasic acids themselves can be realized using an aqueous rinsing solution as regenerant for the anion exchange resins. The separations which are possible as a result of the absorbability of the strong polybasic acids on anion exchange resins in their common monovalent anionic form and the non-absorbability of their salts thereon constitute a surprising discovery for which the explanation is not yet understood.

The strong polybasic acids which can be separated from their salts according to this invention are those having a first ionization constant of at least $1 \times 10^{-3}$ such as phosphoric, pyrophosphoric, glycerophosphoric, phosphorous, sulfuric, sulfurous, selenious, arsenic, oxalic, malonic, maleic, o-phthalic and the like. The salts of strong polybasic acids which are separable from their acids include all conventional water-soluble salts, i.e., those having a solubility in water sufficient to warrant separation. Of these, the metallic salts, both light and heavy metal salts, are especially of interest. Particularly useful are the separations of sulfuric acid from steel mill pickle liquors, and from light transition element sulfates, i.e., sulfates of elements 21 through 28 in the periodic table, and the recovery of phosphoric acid from used ferrous metal phosphatizing solutions. Those relatively few metals which form anionic complexes with polybasic acids and are absorbed in anion exchange resins by an ion-exchange process are excluded from the scope of this invention.

In practice, an aqueous solution of a strong polybasic acid, as defined, and one or more of its salts, which solution is at least 0.5 normal in such acid (normality=molarity multiplied by the total number of ionizable hydrogens per mole, both strong and weak), is contacted with a water-immersed or preferably 0.5 normal polybasic acid-immersed bed of an anion exchange resin in the monovalent anionic form common to that of the acid, with displacement from the bed of an equal volume of immersion liquid. Thereafter, an aqueous rinsing solution is introduced to displace and wash the residual solution from the resin bed. The effluent liquor is collected as successive fractions whereby there are obtained effluent fractions containing the salt as the principal solute and effluent fractions containing the polybasic acid as the principal solute. These cycles are repeated as desired. Alternatively, a conventional continuous process can be used. It is necessary that the feed solutions so treated be at least 0.5 normal in acid, since otherwise the monovalent anionic form of the resin will be transformed to a polyvalent anionic form and will not then function in the manner described. The process is usually carried out at room temperature or substantially room temperature, at atmospheric pressure and at temperatures up to about 90° C. but below a temperature harmful to the anion exchange resin.

It it is desired to insure that the resin is in the monovalent anionic form common to that of the acid to be separated therefrom, the aqueous rinsing solution should then be maintained at an acid concentration sufficient to prevent hydrolysis of the indicated monovalent anionic form of the resin to a polyvalent anionic form. If deionized or distilled water is used as a rinse, the resin bed is thereafter converted to the desired monovalent anionic form with dilute aqueous acid prior to re-use. For this purpose, some of the feed solution can be used.

The following examples illustrate specific embodiments and the best mode contemplated for carrying out the inventive process. They are not to be considered limitative of the invention as claimed.

*Example 1*

A 100 ml. 0.5 in. I.D. glass burette was filled with water-immersed Dowex 1 resin, a granular strongly basic quaternary ammonium anion exchange resin. The anion exchange resin was the reaction product of trimethylamine and an insoluble resinous chloromethylated copolymer of approximately 87.5 weight percent styrene, 4.5 percent ar-ethylvinylbenzene and 8 percent divinylbenzene. The resin was in the form of rounded granules 50–100 U.S. mesh size. The anion exchange resin was equilibrated with three complete feed-rinse cycles of a feed of 20 ml. of an aqueous solution 3.75 normal in sulfuric acid and 0.5 normal in nickel sulfate followed by a rinse of 60 ml. of deionized water. Thereafter, the feed-rinse cycle was repeated wtih concentrations of feed as indicated and rinse of deionized water. Concentrations of sulfuric acid and nickel sulfate were determined in successive 5 ml. cuts of eluate. A flow rate of 3 ml./min. (0.6 gal./min./ft.$^2$) was used. Results are given in FIG. 1, wherein the points represent average concentrations at midpoints of the cuts.

*Example 2*

Figure 2:
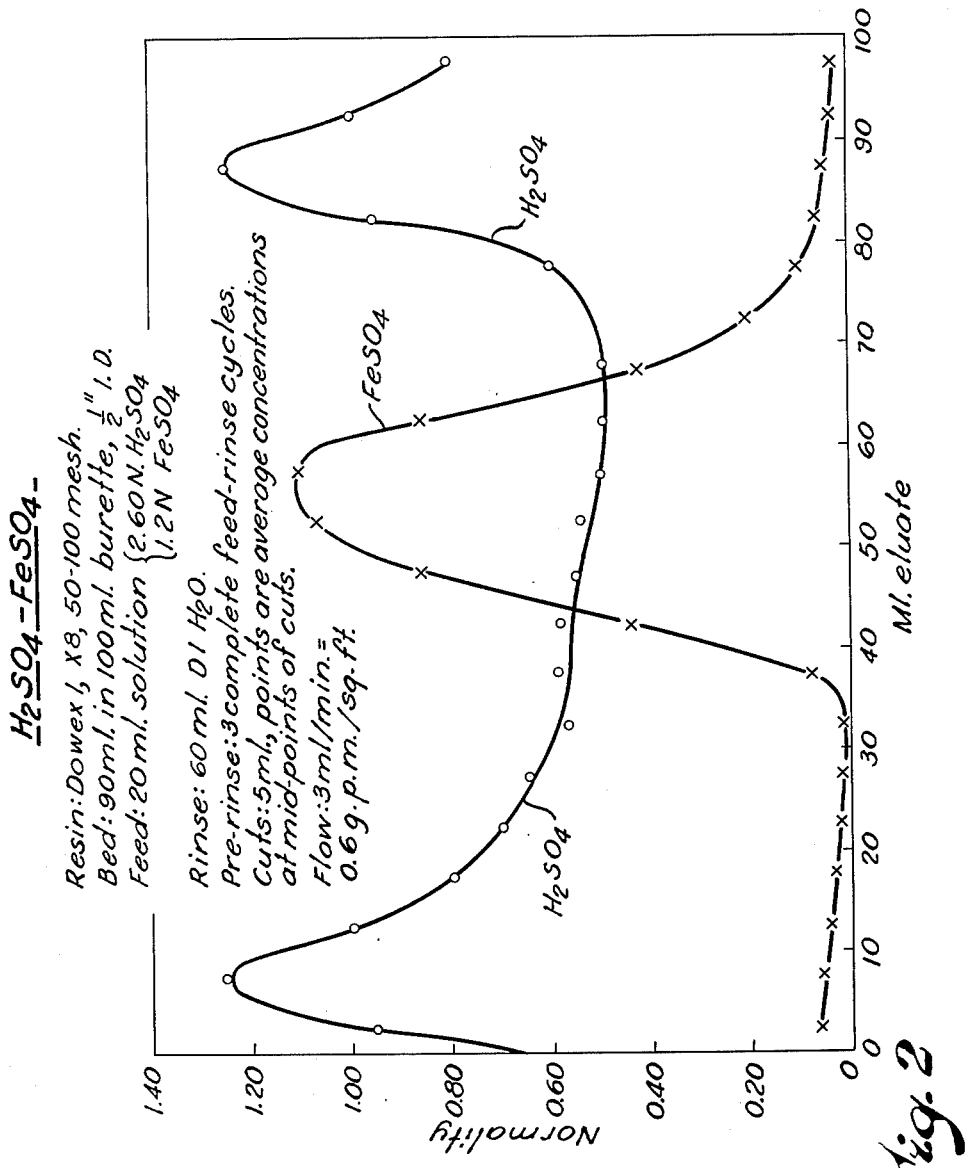

The procedure of Example 1 was repeated with a feed of 20 ml. of an aqueous solution 2.6 normal in sulfuric acid and 1.2 normal in ferrous sulfate. Results are given in FIG. 2.

*Example 3*

Figure 3:
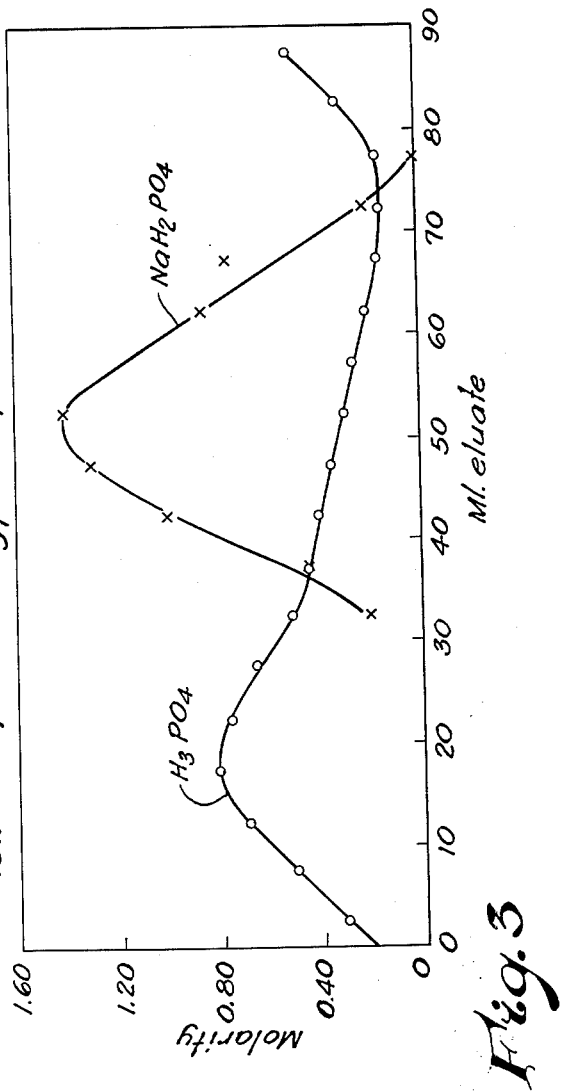

The procedure of Example 1 was repeated with a feed of 20 ml. of an aqueous solution 2.0 molar in phosphoric acid and 2.0 molar in sodium dihydrogen phosphate after the bed had been equilibrated with three complete feed-rinse cycles. Results are given in FIG. 3.

*Example 4*

Figure 4:
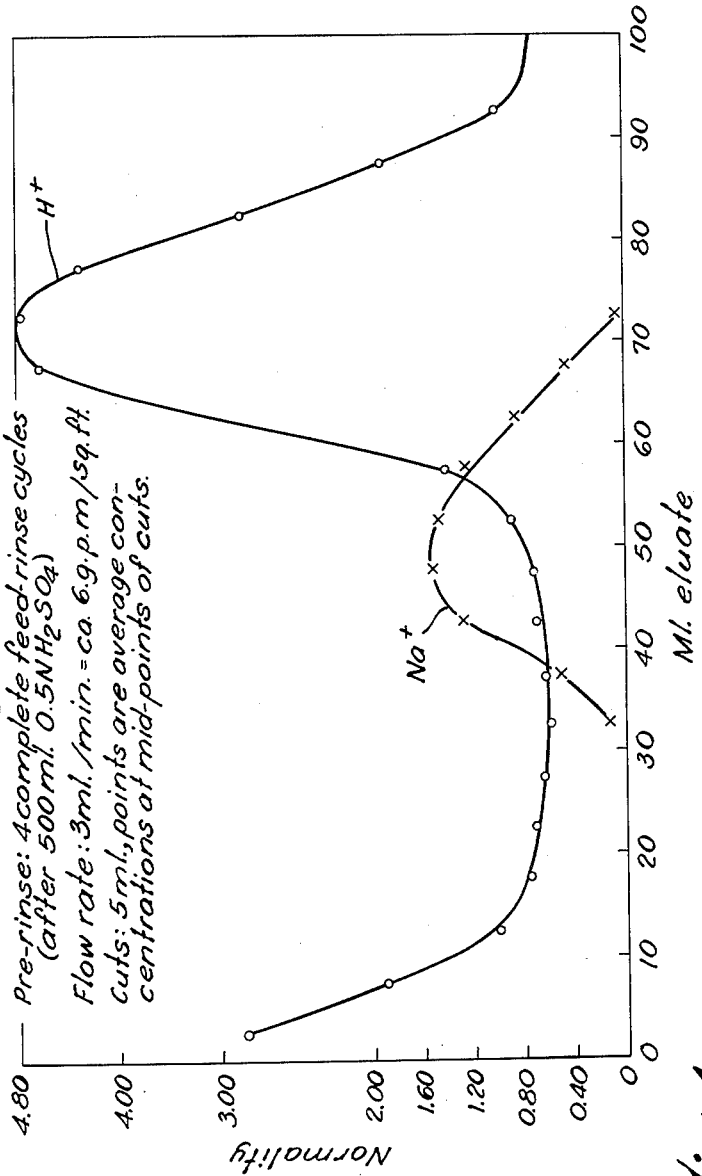

The procedure of Example 1 was repeated with a feed of 20 ml. of an aqueous solution of sulfuric acid and sodium acid sulfate, 5.95 normal in H$^+$ and 1.65 normal in Na$^+$ using a resin bed immersed in 0.5 normal sulfuric acid and rinsing with 0.5 normal sulfuric acid. Results are given in FIG. 4.

*Example 5*

The procedure of Example 1 was repeated with a feed of 20 ml. of an aqueous solution, 1.24 normal in ferrous sulfate and 2.37 normal in sulfuric acid using a flow rate of 30 ml./min. (6 gal./min./ft.$^2$). Results are given in FIG. 4.

Equally good separations of polybasic acids from their salts were obtained with other anion exchange resins in the monovalent anionic form common to that of the polybasic acid.

What is claimed is:

1. A method for separating from one another a strong polybasic acid which has a first ionization constant not less than $1 \times 10^{-3}$ and a conventional water-soluble salt of the said polybasic acid by feeding to a bed of an anion exchange resin, having a monovalent anion identical with that of said acid and immersed in an aqueous liquid of the group consisting of water and dilute aqueous solutions of said polybasic acid having an acid concentration less than that in the feed solution, an aqueous solution of said acid and said salt which solution is at least 0.5 normal in said acid, thus displacing aqueous liquid from the resin bed, thereafter feeding aqueous rinsing solution to the bed to displace a further amount of residual liquid from the bed, and collecting successive fractions of the displaced effluent liquid whereby there is obtained an early fraction of the effluent liquid which contains a higher ratio of said salt to said acid than is in the starting solution and a later fraction of the effluent liquid which contains a higher ratio of said acid to said salt than is in the starting solution.

2. Method of claim 1 wherein the anion exchange resin is a strongly basic quaternary ammonium anion exchange resin.

3. Method of claim 1 wherein the acid is sulfuric acid.

4. Method of claim 1 wherein the acid is phosphoric acid.

5. Method of claim 1 wherein the acid is sulfuric acid and the salt is ferrous sulfate.

6. Method of claim 1 wherein the acid is sulfuric acid and the salt is a heavy metal sulfate.

7. Method of claim 6 wherein the salt is a metal sulfate of elements 21 through 28 of the periodic table.

References Cited in the file of this patent

UNITED STATES PATENTS

| | | |
|---|---|---|
| 2,572,848 | Fitch | Oct. 30, 1951 |
| 2,684,331 | Bauman | July 20 1954 |
| 2,771,193 | Simpson et al. | Nov. 20, 1956 |